May 30, 1944.  M. R. EBERT  2,349,853
HEADLIGHT ATTACHMENT
Filed March 26, 1943
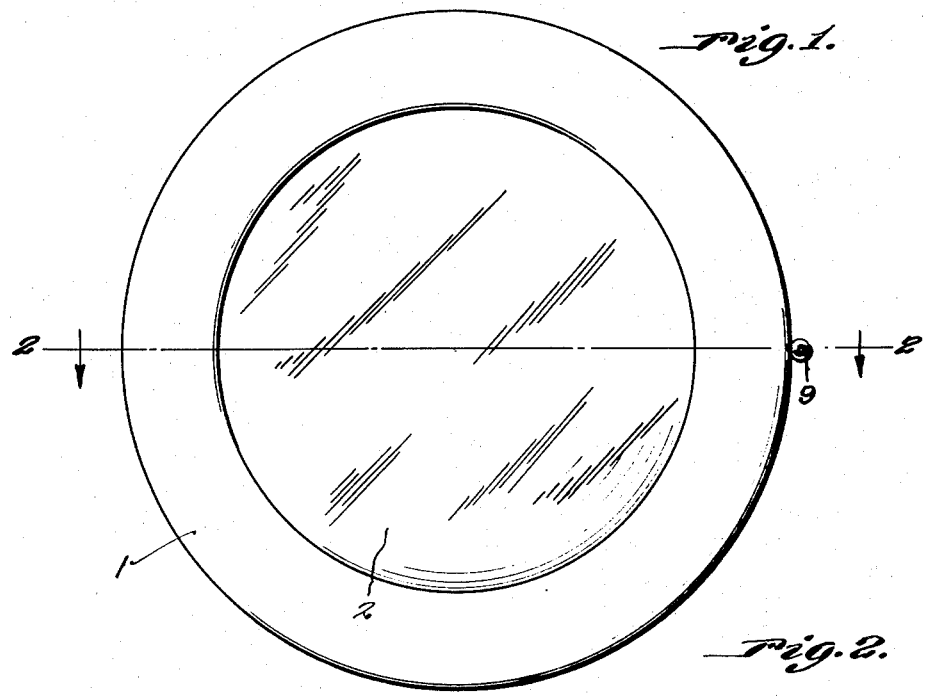
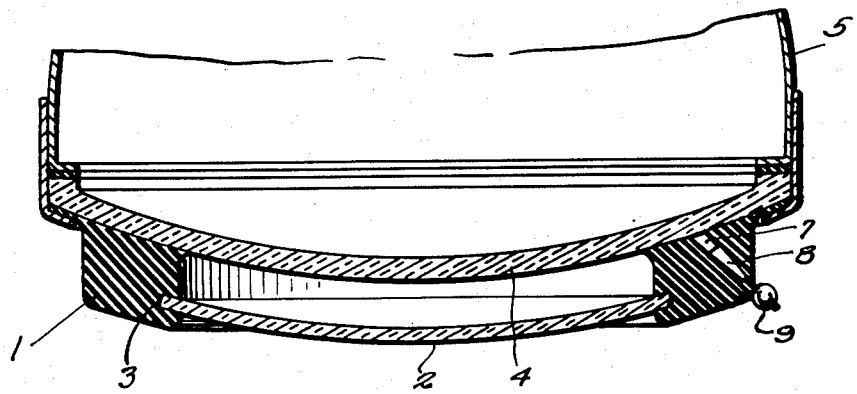
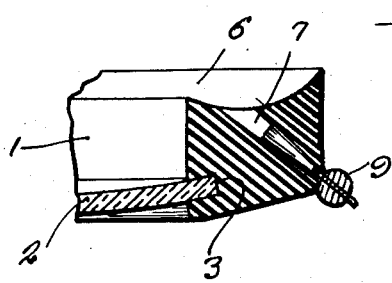
Inventor
Milton Ray Ebert
By Clarence A. O'Brien
and Harvey B. Jacobson
Attorneys Patented May 30, 1944

2,349,853

UNITED STATES PATENT OFFICE 2,349,853

HEADLIGHT ATTACHMENT

Milton Ray Ebert, Erie, Pa.

Application March 26, 1943, Serial No. 480,689

1 Claim. (Cl. 240—48.4)

The present invention relates generally to new and useful improvements in headlights, and has for its primary object to provide, in a manner as hereinafter set forth, a fog penetrating device which is adapted to be expeditiously secured by suction in position on the headlight lens.

Another very important object of the invention is to provide a fog penetrating attachment for headlights comprising novel means whereby the vacuum or suction may be readily broken to facilitate removal of the device from the headlight lens.

Other objects of the invention are to provide a headlight attachment of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in front elevation of a headlight attachment constructed in accordance with the present invention.

Figure 2 is a view in horizontal section, taken substantially on the line 2—2 of Figure 1, but showing the attachment in position on the lens of a headlight.

Figure 3 is a fragmentary view in section through the portion of the device which includes the vent valve.

Referring now to the drawing in detail, it will be seen that the embodiment of the invention which has been illustrated comprises a resilient rubber ring 1 of suitable dimensions. The ring 1 has mounted therein a substantially concavo-convex amber filtering glass or lens 2. The rubber ring 1 has a groove or channel 3 formed in its inner periphery for the reception of the peripheral portion of the filtering glass 2.

The ring 1 is adapted to be removably mounted on the usual lens 4 of a headlight 5. Toward this end, the rear end of the ring 1 is beveled to conform substantially to the concavo-convex shape of the headlight lens 4. Further, this rear end of the rubber ring 1 is substantially concave in cross-section for providing an annular vacuum channel 6.

A substantially conical passage 7 in the ring 3 communicates with the vacuum channel 6. A substantially conical valve 8 controls the passage 7. A ball 9 is threaded on one end portion of the valve 8 and engageable with the ring 1 for seating said valve and closing the passage 7.

It is thought that the manner of using the attachment will be readily apparent from a consideration of the foregoing. Briefly, to mount the attachment in position for use on a vehicle headlight, the rubber vacuum ring 1 is simply pressed against the headlight lens for supporting the filtering glass 2 thereon in spaced relation thereto. The resilient rubber ring may be readily collapsed against the headlight lens 4 in a manner to cause said ring to be retained thereon by suction. The application of the device is facilitated by the fact that the headlight lens will usually be already moist or wet from the fog. To remove the device, it is only necessary to unscrew or back-off the ball 9 and then push inwardly thereon for unseating or opening the valve 8, thereby breaking the vacuum in the ring 1.

It is believed that the many advantages of a headlight attachment constructed in accordance with the present invention will be readily understood, and although a preferred embodiment of the device is an illustrated and described, it is to be understood that changes in the details of construction may be resorted to which will fall within the scope of the invention as claimed.

What is claimed is:

A fog penetrating attachment for headlights comprising a resilient rubber vacuum ring for mounting on a headlight lens and having a transversely curved vacuum channel on its inner surface, said ring having a substantially conical passage therein providing atmospheric communication with the vacuum channel, said ring further having a circumferential groove in its inner periphery, a substantially concavo-convex filter glass mounted in the ring and having its periphery engaged in the groove, a substantially conical valve operable in the passage for controlling same, and a ball threaded on the outer end portion of the valve, said ball being engageable with the ring for securing the valve in closed position in the passage.

MILTON RAY EBERT.